United States Patent Office

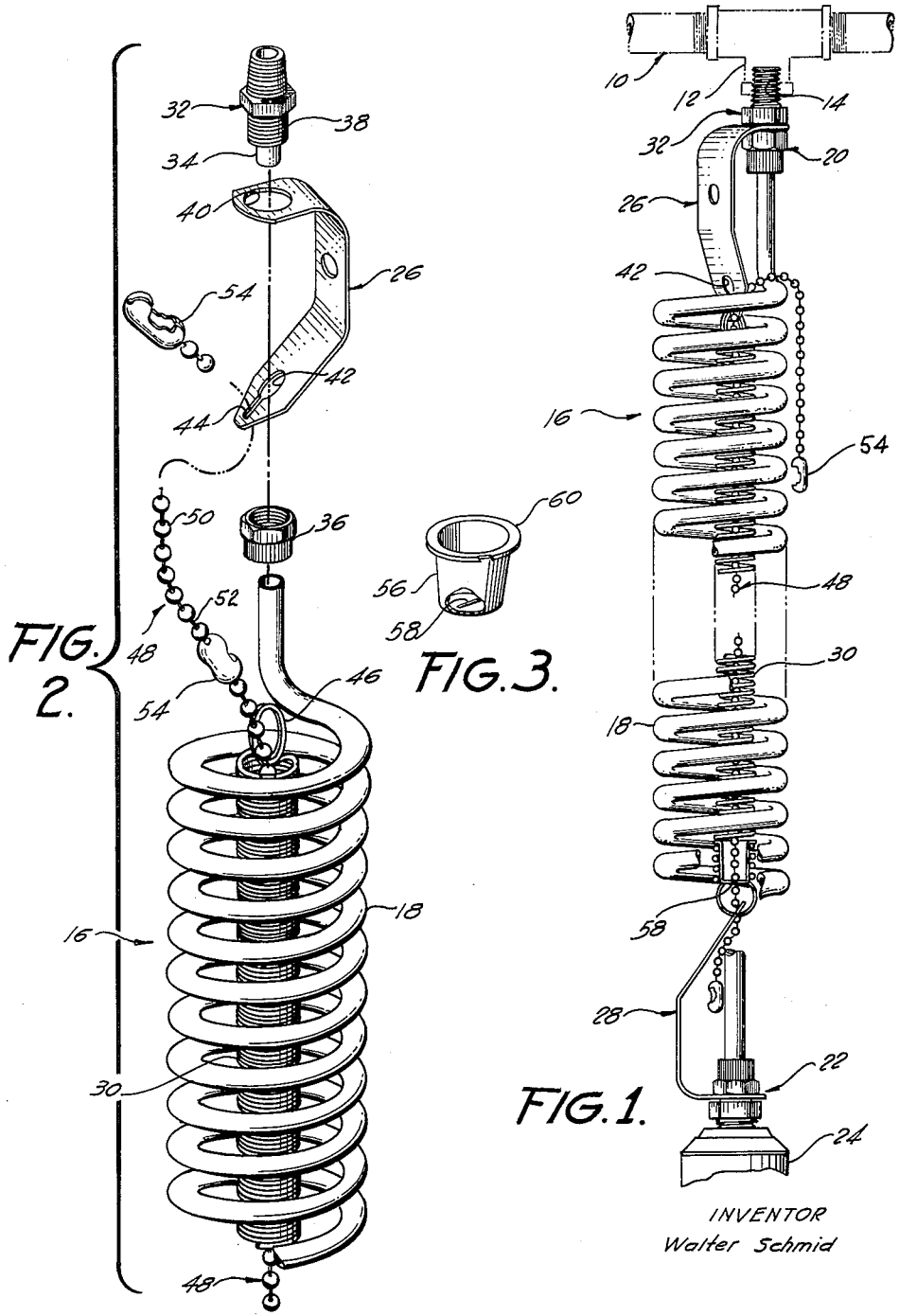

3,211,473
Patented Oct. 12, 1965

3,211,473
HOLDER FOR A PNEUMATIC APPLIANCE
Walter Schmid, Bensenville, Ill., assignor to Stewart-Warner Corporation, Chicago, Ill., a corporation of Virginia
Filed Aug. 21, 1962, Ser. No. 218,402
2 Claims. (Cl. 285—114)

This invention relates to a holder for a pneumatic appliance, and in particular, to an extensible holder operable both to supply the appliance with air from, and to restrain the appliance structurally from, a supply tap of the pneumatic system.

Many appliances including portable hand tools such as screw drivers, impact wrenches and nut setters are air powered. Pneumatic supply means including a flexible hose or the like connect the appliance to a source of pneumatic power, such as a tap in the pneumatic system. At times, particularly in assembly line work, it is desirable to position the appliance or tool proximate its work area so that a minimum of effort is required to move the tool alternately between its active working positions and its inactive placed away position. Various typical support means, such as reels, counterweights, and the like, commonly suspend the placed away tool above the work area, and extend the tool to its work positions.

Separate support and pneumatic supply means, however, are not entirely satisfactory. For example, the duplicate separate facilities of each needlessly increase the initial cost of the assembly while actually limiting its versatility by awkwardness in use. Thus, separate support and supply means commonly become hooked or tangled to hinder free tool movement. Also, since the separate means are not between identical points, or of identical extensibility, the moving range of the tool is not uniform directionally.

Accordingly, the object of this invention is to provide for a pneumatic appliance a low cost holder between a supply tap of the pneumatic system and the appliance operable for supplying pneumatic power to the appliance while permitting free extension of the appliance from the supply tap within adjustable limits with a minimum of interference.

In order that this and other objects can be more fully understood reference is herein made to the accompanying drawing, wherein:

FIG. 1 is an elevational view of the subject holder in typical assembled relationship between a pneumatic system (in phantom) and a pneumatic appliance, such as a screw driver or the like;

FIG. 2 is an exploded perspective view of the upper portion of the holder of FIG. 1; and FIG. 3 is an enlarged perspective view of a plug used in the holder of FIGS. 1 and 2.

A pneumatic line 10 shown in phantom in FIG. 1 includes a T-connection 12 having a bore or tap 14 adapted to receive a coupling or fitting, as is well known in the art. The pneumatic line 10 is proximate the working area, preferably elevated above it by a distance sufficient to avoid interference during work, such as typically 30 to 50 inches above the top of a work table.

The subject holder 16 includes pneumatic supply means composed of a flexible tube 18 having couplings or fittings 20 and 22 secured at its opposite ends. The couplings are adapted to be connected to the pneumatic tap 14 and to a pneumatic operated appliance or tool 24 (only the upper part of which is shown in the FIG. 1) to form a fluid communication therebetween. The tube 18 is coiled to a helix of convenient diameter, such as 2″ O.D. for a ¼″ tube, so that its retracted length occupies a much smaller linear distance than its fully extended length.

The tube is fabricated of polyethylene material or the like so that it can be coiled in a helix and heat set to resist uncoiling. Such material also is impervious to oils while having a safe pressure capacity sufficient for operation of the appliance.

The holder 16 further includes support or restraining means extensible between the fittings 20 and 22 of the tool 24 and the pneumatic tap 14. Opposing brackets 26 and 28 are swivelled to the coupling fittings 20 and 22, respectively, and a coil spring 30 positioned within the helix of tube 18 is secured between the brackets. The spring 30 is of such length and capacity to permit sufficient free extension of the tool toward the working area for expedient use thereof.

Structurally, the couplings 20 and 22 include a fitting 32 having a insert portion 34 adapted to fit into the open end of the tube, and a cap 36 threaded onto section 38 of the fitting effective to seal the tube tightly to the fitting. The brackets 26 and 28 are generally C-shaped with each having an opening 40 at one end to receive the threaded section 38 of the coupling for forming a swivel connection between the members. The opposite end of each bracket has a slotted opening therein including opening 42 and a narrower slot 44 extending therefrom away from the opening 40. The coil spring 30 has looped ends 46 which can be manipulated to interlock with the openings 42 and 44 for connection to the brackets 34.

Positive restraining means can further be included to prevent over-extension of both the coil spring 30 and of the coiled flexible tube 18. Bead chain 48 extends between the brackets 26 and 28 through the slotted openings 42 and 44 therein. The chain 48 is composed of beads 50 connected by links 52, as is well known in the art. Each link is of such dimension that it fits within the slot 44, while each bead 50 is of such size that it cannot pass through the slot 44 but can fit through opening 42. Thus, a readily adjustable positive connection between the chain and bracket is provided by merely shifting the position of the beads 50 relative to the slotted bracket. Also, by means of separate joints 54 larger than the opening 42, complete removal of the chain 48 through the opening can be prevented. A pair of joints 54 on the chain at spaced locations on opposite sides of the brackets provide ready maximum and minimum extensible adjustment.

The chain 48 fits within the coil spring 30 in an out-of-the-way position above a plug member 56. Thus, when the spring is fully retracted, the chain 48 merely piles up inside the spring 30 above the plug 56 to maintain an orderly assembly. The plug 56 is of plastic and cup-shaped having a small slit 58 in the bottom wall for receiving the chain and permitting limited passage thereof through the plug. The plug can be forced into the helix of spring 30 until ledge portion 60 is worked between adjacent coils to position the plug relative to the spring.

The helical tube 18 around the spring 30, and chain 48 within the spring provides a neat installation of a minimum interference. Both the pneumatic supply means and the resilient support means are extended and retracted together between the same points or locations. The released appliance can be retracted by spring 30 to be out-of-the-way from the work area. The maximum stretch of the appliance can be effectively and quickly adjusted by merely repositioning the chain 48 in the slotted brackets.

While a single embodiment has been shown it will be obvious to those skilled in the art that variations can be made therein without departing from the inventive concept of the disclosure. It is desired, therefore, that the invention be limited only by the claims hereinafter following.

What is claimed is:

1. An appliance support comprising an axially extensible helical tube for coupling a source of power to an appliance, fittings affixed to opposite ends of said tube, a bracket carried by each said fitting, means providing a fixed support for one said bracket, said tube and the other said bracket being suspended from the one said bracket, a coil spring extending through said tube and connected to the respective brackets to return the said tube resiliently from an axially extended condition to a normal axially contracted position, a plug secured within the lower end of said coil spring, said plug having a ledge portion projecting between adjacent coils of said spring to anchor the plug against movement along the spring axis, an elongated member of fixed length and having linked segments extending through said coil spring and plug, said plug being formed with an aperture therethrough snugly receiving and gripping the elongated member between adjoining said segments, said elongated member being adjustably secured to said brackets, the length of said member between said one bracket and said plug being substantially in excess of the contracted length of said coil spring to limit the axial extensibility of said tube, and said plug cooperating with said coil spring to confine the excess length of said elongated member within the coil spring when the tube is in its contracted position.

2. An appliance support as defined in claim 1 in which said brackets are rotatably carried by the respective fittings.

References Cited by the Examiner
UNITED STATES PATENTS

| 1,450,176 | 4/23 | Hopkins | 248—328 |
| 1,683,904 | 9/28 | Knoblock | 248—342 |
| 2,005,334 | 1/35 | Casper | 248—328 |
| 2,249,812 | 7/41 | Duplessis. | |
| 2,706,133 | 4/55 | North | 248—75 X |
| 2,708,525 | 5/55 | Woleslagle | 248—17 X |
| 2,905,194 | 9/59 | Smith | 138—110 |
| 2,916,249 | 12/59 | Wolar | 248—342 X |
| 2,955,149 | 10/60 | Gubernick | 174—69.1 |
| 3,042,355 | 7/62 | Stevens | 248—328 |

FOREIGN PATENTS

| 203,392 | 7/55 | Australia. |
| 603,122 | 3/60 | Italy. |

CARL W. TOMLIN, *Primary Examiner.*